United States Patent
Wheeler

(10) Patent No.: US 12,219,941 B1
(45) Date of Patent: Feb. 11, 2025

(54) ANIMAL WATERING SYSTEM

(71) Applicant: Christopher Wheeler, Harrison, AR (US)

(72) Inventor: Christopher Wheeler, Harrison, AR (US)

( * ) Notice: Subject to any disclaimer, the term of this patent is extended or adjusted under 35 U.S.C. 154(b) by 388 days.

(21) Appl. No.: 17/828,252

(22) Filed: May 31, 2022

Related U.S. Application Data

(63) Continuation-in-part of application No. 16/225,441, filed on Dec. 19, 2018, now abandoned, which is a continuation-in-part of application No. 16/058,372, filed on Aug. 8, 2018, now abandoned.

(60) Provisional application No. 62/542,677, filed on Aug. 8, 2017.

(51) Int. Cl.
*A01K 7/02* (2006.01)

(52) U.S. Cl.
CPC ...................................... *A01K 7/02* (2013.01)

(58) Field of Classification Search
CPC .... A01K 7/027; A01K 63/006; A01K 45/002; A01K 63/003; A01K 63/042; A01K 39/02
USPC ........................................ 119/75.2, 475, 51.5
See application file for complete search history.

(56) References Cited

U.S. PATENT DOCUMENTS

| | | | |
|---|---|---|---|
| 3,473,517 A | 10/1969 | Jensen et al. | 119/72.5 |
| 4,248,177 A | 2/1981 | Peterson et al. | 119/73 |
| 4,258,666 A | 3/1981 | Edstrom | 119/72.5 |
| 4,269,147 A | 5/1981 | Vorbeck | 119/73 |
| 4,491,088 A | 1/1985 | Hostetler | 119/72.5 |
| 4,788,938 A | 12/1988 | Davenport | A01K 63/006 |
| 4,962,730 A | 10/1990 | Schafer | 119/73 |
| 5,105,768 A | 4/1992 | Johnson | 119/61 |
| 5,127,366 A | 7/1992 | Kim | A01G 31/02 |
| 5,501,178 A | 3/1996 | Kemp | 119/74 |
| 5,799,609 A | 9/1998 | Burns et al. | 119/74 |
| 5,799,614 A | 9/1998 | Greenwood | 119/452 |
| 5,842,437 A | 12/1998 | Burns | 119/74 |
| 6,079,361 A | 6/2000 | Bowell et al. | 119/72 |
| 6,079,951 A | 6/2000 | Morton | A01K 45/002 |
| 6,106,731 A | 8/2000 | Hayes | 210/760 |
| 6,148,767 A | 11/2000 | Manchess | 119/75 |
| 6,460,483 B1 | 10/2002 | Northrop et al. | 119/74 |
| 6,622,657 B2 | 9/2003 | Northrop et al. | 119/74 |
| 6,928,954 B2 | 8/2005 | Krishnamurthy | 119/51.5 |
| 7,089,881 B2 | 8/2006 | Plante | 119/74 |
| 7,146,930 B1 | 12/2006 | Ness | 119/77 |
| 7,270,082 B2 | 9/2007 | Plante | 119/74 |
| 7,281,494 B1 | 10/2007 | Connerly | 119/77 |
| 7,958,844 B1 | 6/2011 | Northrop | 119/74 |

(Continued)

*Primary Examiner* — Jeffrey R Larsen
(74) *Attorney, Agent, or Firm* — Jonathan A. Bay

(57) ABSTRACT

A recirculating, animal watering system has an upright reservoir with a tubular sidewall extending between upper and lower end caps. The sidewall has an open mouth nearer the upper end cap. Thus the reservoir below the mouth serves as a water supply pool. A water supply conduit extends vertically from a lower communication port submerged in the water supply pool and at least one fountain discharge outlet arranged in the reservoir above or at the level of the mouth. An air supply line is included and extends between a source of pressurized air and a submerged air injection site into the water supply conduit. Given the foregoing, a small steady stream of air lifts water from the water supply pool, up the water supply conduit by plug or slug flow and out through the at least one fountain discharge outlet to trickle or drizzle back into the water supply pool.

20 Claims, 7 Drawing Sheets

(56) References Cited

U.S. PATENT DOCUMENTS

| | | | |
|---|---|---|---|
| 8,096,266 B2 | 1/2012 | Rowe | 119/74 |
| 8,132,531 B1 | 3/2012 | Martin | 119/74 |
| 8,381,685 B2 | 2/2013 | Lipscomb et al. | 119/74 |
| 8,555,816 B2 | 10/2013 | Weber et al. | 119/74 |
| 8,763,557 B2 | 7/2014 | Lipcomb et al. | 119/74 |
| 8,770,147 B2 | 7/2014 | Rowe | 119/72 |
| 8,875,659 B2 | 11/2014 | Schumacher et al. | 119/73 |
| 8,887,666 B2 | 11/2014 | Liu et al. | 119/74 |
| 9,809,992 B1 | 11/2017 | Barlow | A01K 31/14 |
| 2003/0150394 A1 | 8/2003 | Wolfe | A01K 63/003 |
| 2006/0011528 A1 | 1/2006 | Ireland | 210/167 |
| 2006/0174838 A1 | 8/2006 | Plante | 119/74 |
| 2008/0001001 A1 | 1/2008 | Pevnick | B05B 17/08 |
| 2008/0078330 A1 | 4/2008 | McCallum et al. | 119/72 |
| 2011/0067638 A1 | 3/2011 | Lipscomb et al. | 119/74 |
| 2011/0259273 A1 | 10/2011 | Lipscomb et al. | 119/74 |
| 2012/0017839 A1 | 1/2012 | Vaness et al. | 119/74 |
| 2013/0019809 A1 | 1/2013 | McCallum et al. | 119/75 |
| 2013/0174790 A1 | 7/2013 | Lipscomb | 119/74 |
| 2013/0228132 A1 | 9/2013 | Lipscomb et al. | 119/74 |
| 2017/0251642 A1 | 9/2017 | Capodice | A01K 63/006 |

ANIMAL WATERING SYSTEM

CROSS-REFERENCE TO PROVISIONAL APPLICATION(S)

This application is a continuation-in-part of U.S. patent application Ser. No. 16/225,441, filed Dec. 19, 2018, which is a continuation-in-part of U.S. patent application Ser. No. 16/058,372, filed Aug. 8, 2018, which claims the benefit of U.S. Provisional Application No. 62/542,677, filed Aug. 8, 2017, the disclosures of which are incorporated herein by this reference thereto.

BACKGROUND OF THE INVENTION

The invention relates to animal watering systems and, more particularly, recirculating animal watering systems.

The animal watering system in accordance with the invention was inspired for such animals as and without limitation collectible or zoological-specimen lizards, as well as other reptiles and amphibians, even insects or the like (ie., the insects are presumptively feeder critters like crickets).

But to return to lizards, the inventor is an avid collector of lizards. There is a sizable public who share similar interests as evidenced by the active forums and trade shows therefor. Lizards are interesting specimens for many reasons including they are colorful, moderately active, some make noises or displays, and have other behavioral patterns which seem to give them personalities.

What lizards aren't very good at is, drinking water. Or at least, lizards typically make it a very slow process that in ways looks laborious. Perhaps it's best to say that, they are inefficient at it.

There used to be a belief that some desert lizards could absorb water through their skin. That is now discredited. Lizards in the driest deserts catch every drop of water they can. For example, the thorny devil (*moloch horridus*) that lives in Australian deserts has the ability to drink with the aid of its skin. This lizard is covered with spiked scales, and between these scales are water-collecting grooves that run all over its body. The moisture-attracting grooves can absorb water like blotter paper, and collect night-time dew that settles on the lizard's back. The grooves trend toward the lizard's mouth, which then sucks the minute water droplets that drivel in from all over its body.

While lizards aren't prodigious consumers of water, they must drink some. And again, they are not very efficient at it. Video (eg., as can be accessed on YOUTUBE® and elsewhere online) shows that some lizards lick water up with their tongue. Others (eg., bearded dragons) lunge and bite water a droplet as if it's a morsel of food. But none of this behavior should be confused with the efficiency of dogs noisily lapping up water, or 'wolfing' down food.

Again, video shows that, for lizards that lick up water, the process is very slow. Given a puddle or water drop on a flat surface, small lizards lift their head up then arch their neck to study the target. Then the lizard performs an unhurried lick. There is typically a fairly long pause between each lick, maybe even flattening the body again. And the evidence of how long it takes to for a small lizard to lick up one drop of water suggests that, each lick probably only draws in the minutest swallow of water.

It is an aspect of the invention to provide an animal watering system that accommodates the habits of a wide variety of animals, including ones who have low consumption rates and/or cumbersome drinking habits.

SUMMARY OF THE INVENTION

These and other aspects and objects are provided according to the invention in an animal watering system that accommodates the habits of a wide variety of animals, including ones who have low consumption rates and/or cumbersome drinking habits, along the following non-exclusive, exemplary, enumerated characteristics.

One. An air-pump powered recirculating drinking-water delivery system for one to a plurality of pet, collectible or zoological-specimen lizards confined inside a pen, cage, terrarium or other like confined holding area; said system comprising:

an air-pump for sitting outside the confined holding area;
a recirculating drinking-water delivery device for sitting inside the confined holding area; and
an external flexible air supply hose connected to the air-pump and being sufficiently elongated to extend to provide air supply service to the recirculating drinking-water delivery device inside the confined holding area;
the recirculating drinking-water delivery device comprising:
an upright elongated plastic pipe of no less than four inches (4 inches) in diameter, extending between a bottom end closed by a bottom cap affixed in a water-tight seal with the bottom end, and, an open top end capped by a removable lid;
the upright elongated plastic pipe defining, as between the bottom cap and removable lid, a core;
wherein the upright elongated plastic pipe has a circular mouth formed therein high above the bottom cap, which is also about four inches (4 inches) in diameter;
the circular mouth being characterized by a rim having a low elevation extreme and high elevation extreme;
a removable generally circular shelf disposed horizontally inside the upright elongated plastic pipe at a lower-chosen elevation high above the bottom cap and proximate the low elevation extreme of the circular mouth;
an annular seat provision or an annularly-distributed plurality of spaced seat provisions affixed inside the pipe to removably support the shelf at the lower-chosen elevation;
an air-supply through-fitting disposed through the removable lid having an outside fitting end receiving the air supply service of the outside air-pump and having an inside fitting end;
a drip manifold comprising an elongated tube being closed at both ends, being characterized by a diameter much less than the diameter of the upright elongated plastic pipe, and being three inches (3 inches) or more long;
the drip manifold being affixed to the removable lid such that when the removable lid is in place on the open top end of the upright elongated plastic pipe, the drip manifold is suspended inside the core at a higher chosen elevation which is level with or higher than the high elevation extreme of the rim of the circular mouth;
the drip manifold being further formed with at least one drip discharge outlet;

a water supply conduit inside the core and having an elongated generally vertical run extending between a water-intake end proximate the bottom cap an upper water-communication connection with the drip manifold, the shelf being formed with an aperture or cut that allows the water supply conduit to pass therethrough;

an internal air supply hose inside the core being elongated between an upper end connected to the inside fitting end of the air-supply through-fitting and a lower end providing an air-injection site below the water-intake end of the water supply conduit or through the water supply conduit proximate the water-intake end thereof, with the shelf being provided with an aperture or cut or the shelf being formed with a further aperture or further cut that allows the internal air supply hose to pass therethrough;

whereby the upright elongated plastic pipe generally below the lower chosen elevation serves as a reservoir for a week or more supply of drinking water for a plurality of lizards, and a small stream of air supplied by the air pump lifts drinking water from the reservoir, up the water supply conduit by plug or slug flow and out through the at least one drip discharge outlet to fall between the upper and lower chosen elevation, and then fall on down past the shelf and back into the reservoir; and thus whereby the air-pump powered recirculating drinking-water delivery system for one to a plurality of pet, collectible or zoological-specimen lizards confined inside a pen, cage, terrarium or other like confined holding area provides lizard drinking-water service for the confined holding area without otherwise limiting by design the confined holding area to be otherwise as whole a desert climate.

Two. Given the air-pump powered recirculating drinking-water delivery system for one to a plurality of pet, collectible or zoological-specimen lizards confined inside a pen, cage, terrarium or other like confined holding area according to One above, wherein:

the drip manifold comprises an elongated closed-ended plastic pipe characterized by a diameter of generally one-half inch (½ inch).

Three. Given the air-pump powered recirculating drinking-water delivery system for one to a plurality of pet, collectible or zoological-specimen lizards confined inside a pen, cage, terrarium or other like confined holding area according to Two above, further comprising:

a generally vertical fountain feature comprising a generally planar curtain arranged as a plurality of hanging synthetic simulative leafed vegetation underneath the elongated tubular drip manifold;

the elongated tubular drip manifold being formed with one plurality of apertures for drinking water to drip out, another plurality of apertures for hanging thereunder the generally vertical fountain feature comprising the generally planar curtain arranged as a plurality of hanging synthetic simulative leafed vegetation, and then one more hole for connection with the water supply conduit;

whereby the preferred rate of flow of drinking water into the manifold is a trickle or a dribble, where drinking water streams down vertical fountain feature in ever-changing lateral meanders, and finally drips off tip ends of the simulated leafed vegetation in drops; thereby giving lizards a draw to explore the vertical fountain feature, and to be able to look at and take water off a vertical surface in a comfortable posture.

Four. Given the air-pump powered recirculating drinking-water delivery system for one to a plurality of pet, collectible or zoological-specimen lizards confined inside a pen, cage, terrarium or other like confined holding area according to Two above, wherein:

the drip manifold is suspended from the removable lid, the vertical fountain feature is hung from the drip manifold, the water supply conduit is connected at the top thereof to the drip manifold, and the internal air supply hose is connected at the upper end thereof being connected to the inside fitting end of the air-supply through-fitting through the removable lid as well as is associated with the air-injection site below the water-intake end of the water supply conduit or is connected through the water supply conduit proximate the water-intake end thereof:

all such that the removable lid, the drip manifold, the vertical fountain feature, the water supply conduit and the internal air supply hose lift up and out as a unit away from the upright elongated plastic pipe by a caretaker in performance of periodic maintenance, cleaning and/or other attention to the air-pump powered recirculating drinking-water delivery system.

Five. Given the air-pump powered recirculating drinking-water delivery system for one to a plurality of pet, collectible or zoological-specimen lizards confined inside a pen, cage, terrarium or other like confined holding area according to Four above, wherein:

the shelf comprises a cylindrical apertured shelf provided with distributed plurality of drain holes sized and proportioned for the caretaker reach through the window/mouth and use fingers or other pry to lift the shelf along with the removal of the removable lid, the drip manifold, the vertical fountain feature, the water supply conduit and the internal air supply hose being lifted up and out as a unit;

whereby the shelf may be fixed with any of or unfixed with all the removable lid, the drip manifold, the vertical fountain feature, the water supply conduit and the internal air supply hose but still needs to clear out with the removal of the removable lid, the drip manifold, the vertical fountain feature, the water supply conduit and the internal air supply hose being lifted up and out as a unit, particularly for the water supply conduit and the internal air supply hose.

Six. Given the air-pump powered recirculating drinking-water delivery system for one to a plurality of pet, collectible or zoological-specimen lizards confined inside a pen, cage, terrarium or other like confined holding area according to Five above, further comprising:

a pair of disk filter elements carried by the shelf, one being characterized by ammonia reducing water treatment filter properties, the other being characterized by being black carbon-based, wherein of the pair one is the upper of the pair and defines a floor level for lizards that stretch through or enter the mouth in whole or in part to drink water off the generally vertical fountain feature;

floating plastic bio-balls, or sinking porous ceramic tubes, or both provided in the reservoir below the shelf whereby providing the service of ammonia and/or nitrite reducing work.

Seven. Given the air-pump powered recirculating drinking-water delivery system for one to a plurality of pet, collectible or zoological-specimen lizards confined inside a pen, cage, terrarium or other like confined holding area according to Six above, wherein:

the core of the upright elongated plastic pipe between the lid and the shelf or floor forms a grotto-like retreat whereby providing a daytime retreat for nocturnal lizards.

Eight. Alternatively, an air-pump powered recirculating drinking-water delivery system for one to a plurality of pet, collectible or zoological-specimen lizards confined inside a pen, cage, terrarium or other like confined holding area; said system comprising:

an air-pump for sitting outside the confined holding area;

a recirculating drinking-water delivery device for sitting inside the confined holding area; and an air supply conduit connected to the air-pump and being sufficiently elongated to extend to provide air supply service to the recirculating drinking-water delivery device inside the confined holding area;

the recirculating drinking-water delivery device comprising:

an upright elongated plastic pipe having a core diameter big enough for a caretaker to stick a hand therein and having a height of no less than three times (3×) and no more the six times (6×) the core diameter, the upright elongated plastic pipe extending between a bottom end closed by a bottom cap affixed in a water-tight seal with the bottom end, and, an open top end capped by a removable lid;

the upright elongated plastic pipe defining, as between the bottom cap and removable lid, the core;

wherein the upright elongated plastic pipe has a circular mouth formed therein high above the bottom cap, which has a mouth diameter also about comparable to the core diameter and big enough for a caretaker to reach therethrough (wherein, the mouth diameter might be between $\frac{1}{2}$ to $1\frac{1}{2}$ times the core diameter);

the circular mouth being characterized by a rim having a low elevation extreme and high elevation extreme;

a removable generally circular shelf disposed horizontally inside the upright elongated plastic pipe at a lower-chosen elevation high above the bottom cap and proximate the low elevation extreme of the circular mouth;

an annular seat provision or an annularly-distributed plurality of spaced seat provisions affixed inside the pipe to removably support the shelf at the lower-chosen elevation;

a drip manifold comprising an elongated tube being closed at both ends, being characterized by a diameter much less than the core diameter of the upright elongated plastic pipe, and having a length at least one half ($\frac{1}{2}$) the core diameter or longer but abbreviated enough to suspend horizontally inside the core and from the removable lid;

the drip manifold being affixed to the removable lid such that when the removable lid is in place on the open top end of the upright elongated plastic pipe, the drip manifold is suspended inside the core at a higher chosen elevation which is level with or higher than the high elevation extreme of the rim of the circular mouth;

the drip manifold being further formed with at least one drip discharge outlet;

a water supply conduit inside the core and having an elongated generally vertical run extending between a water-intake end proximate the bottom cap an upper water-communication connection with the drip manifold, the shelf being formed with an aperture or cut that allows the water supply conduit to pass therethrough;

the air supply conduit passing through the removable lid and being characterized by an external air-communication run outside the core and extending from the air pump to the removable lid, as well as an internal air-communication run inside the core and extending from the removable lid to a lower end providing an air-injection site below the water-intake end of the water supply conduit or through the water supply conduit proximate the water-intake end thereof, with the shelf being provided with an aperture or cut or the shelf being formed with a further aperture or further cut that allows the internal air-communication run to pass therethrough;

whereby the upright elongated plastic pipe generally below the lower chosen elevation serves as a reservoir for a week or more supply of drinking water for a plurality of lizards, and a small stream of air supplied by the air pump lifts drinking water from the reservoir, up the water supply conduit by plug or slug flow and out through the at least one drip discharge outlet to fall between the upper and lower chosen elevation, and then fall on down past the shelf and back into the reservoir; and thus whereby the air-pump powered recirculating drinking-water delivery system for one to a plurality of pet, collectible or zoological-specimen lizards confined inside a pen, cage, terrarium or other like confined holding area provides lizard drinking-water service for the confined holding area without otherwise limiting by design the confined holding area to be otherwise as whole a desert climate.

Nine. Given the air-pump powered recirculating drinking-water delivery system for one to a plurality of pet, collectible or zoological-specimen lizards confined inside a pen, cage, terrarium or other like confined holding area according to Eight above, wherein:

the drip manifold comprises an elongated closed-ended plastic pipe characterized by a diameter of generally about one-eighth ($\frac{1}{8}$th) the core diameter (eg., between $\frac{1}{128}$ and $\frac{1}{4}$ times the core diameter).

Ten. Given the air-pump powered recirculating drinking-water delivery system for one to a plurality of pet, collectible or zoological-specimen lizards confined inside a pen, cage, terrarium or other like confined holding area according to Eight above, further comprising:

a generally vertical fountain feature comprising a generally planar curtain arranged as a plurality of hanging synthetic simulative leafed vegetation underneath the elongated tubular drip manifold;

the elongated tubular drip manifold being formed with one plurality of apertures for drinking water to drip out, another plurality of apertures for hanging thereunder the generally vertical fountain feature comprising the generally planar curtain arranged as a plurality of hanging synthetic simulative leafed vegetation, and then one more hole for connection with the water supply conduit;

whereby the preferred rate of flow of drinking water into the manifold is a trickle or a dribble, where drinking water streams down vertical fountain feature in ever-changing lateral meanders, and finally drips off tip ends of the simulated leafed vegetation in drops; thereby giving lizards a draw to explore the vertical fountain feature, and to be able to look at and take water off a vertical surface in a comfortable posture.

Eleven. Given the air-pump powered recirculating drinking-water delivery system for one to a plurality of pet, collectible or zoological-specimen lizards confined inside a pen, cage, terrarium or other like confined holding area according to Eight above, wherein:
   the drip manifold is suspended from the removable lid,
   the vertical fountain feature is hung from the drip manifold,
   the water supply conduit is connected at the top thereof to the drip manifold, and
   the air supply conduit being connected to the removable lid relative to the ending of the external air-communication run and beginning of the internal air-communication run, which is also associated with the air-injection site below the water-intake end of the water supply conduit or is connected through the water supply conduit proximate the water-intake end thereof:
   all such that the removable lid, the drip manifold, the vertical fountain feature, the water supply conduit and the internal air-communication run lift up and out as a unit away from the upright elongated plastic pipe by a caretaker in performance of periodic maintenance, cleaning and/or other attention to the air-pump powered recirculating drinking-water delivery system.

Twelve. Given the air-pump powered recirculating drinking-water delivery system for one to a plurality of pet, collectible or zoological-specimen lizards confined inside a pen, cage, terrarium or other like confined holding area according to Eleven above, wherein:
   the shelf comprises a cylindrical apertured shelf provided with distributed plurality of drain holes sized and proportioned for the caretaker reach through the window/mouth and use fingers or other pry to lift the shelf along with the removal of the removable lid, the drip manifold, the vertical fountain feature, the water supply conduit and the internal air-communication run being lifted up and out as a unit;
   whereby the shelf may be fixed with any of or unfixed with all the removable lid, the drip manifold, the vertical fountain feature, the water supply conduit and the internal air-communication run but still needs to clear out with the removal of the removable lid, the drip manifold, the vertical fountain feature, the water supply conduit and the internal air-communication run being lifted up and out as a unit, particularly for the water supply conduit and the internal air-communication run.

Thirteen. Given the air-pump powered recirculating drinking-water delivery system for one to a plurality of pet, collectible or zoological-specimen lizards confined inside a pen, cage, terrarium or other like confined holding area according to Twelve above, further comprising:
   a pair of disk filter elements carried by the shelf, one being characterized by ammonia reducing water treatment filter properties, the other being characterized by being black carbon-based, wherein of the pair one is the upper of the pair and defines a floor level for lizards that stretch through or enter the mouth in whole or in part to drink water off the generally vertical fountain feature;
   floating plastic bio-balls, or sinking porous ceramic tubes, or both provided in the reservoir below the shelf whereby providing the service of ammonia and/or nitrite reducing work.

Fourteen. Given the air-pump powered recirculating drinking-water delivery system for one to a plurality of pet, collectible or zoological-specimen lizards confined inside a pen, cage, terrarium or other like confined holding area according to Thirteen above, wherein:
   the core of the upright elongated plastic pipe between the lid and the shelf or floor forms a grotto-like retreat whereby providing a daytime retreat for nocturnal lizards.

Fifteen. Furthermore alternatively, a pen, cage, terrarium or other like confined holding area for one to a plurality of pet, collectible or zoological-specimen lizards and an electric-powered air-pump powered recirculating drinking-water delivery system therefor; comprising:
   a pen, cage, terrarium or other like confined holding area for one to a plurality of pet, collectible or zoological-specimen lizards;
   the confined holding area being characterized by a confining sidewall or sidewalls, and, the confining sidewall or sidewalls by a confining height;
   an electric-powered air-pump sitting outside the confined holding area;
   a recirculating drinking-water delivery device sitting inside the confined holding area;
   a flexible air supply conduit connected to the air-pump and being sufficiently elongated to extend over the confining sidewall or sidewalls, and further extend inside the confined holding area to provide air supply service to the recirculating drinking-water delivery device therein;
   the recirculating drinking-water delivery device comprising:
      an upright elongated tube defining an upright elongated core having a core diameter big enough for a caretaker to stick a hand therein;
      the upright elongated tube extending between a bottom end closed by a bottom cap affixed in a water-tight seal with the bottom end, and, an open top end capped by a removable lid;
      the upright elongated tube and removable lid having a combined height less than the confining height of the confining sidewall or sidewalls of the confined holding area;
      the upright elongated tube further being formed with a mouth high above the bottom cap, which mouth is sized to allow a pet, collectible or zoological-specimen lizard to pass therethrough;
      the mouth being characterized by a rim having one portion forming a low elevation extreme and another portion forming a high elevation extreme;
      a removable shelf disposed horizontally inside the upright elongated tube at a lower-chosen elevation high above the bottom cap and proximate the low elevation extreme of the mouth;
      a drip manifold affixed to the removable lid such that when the removable lid is in place on the open top end of the upright elongated tube, the drip manifold is suspended inside core at a higher chosen elevation which is level with or higher than the high elevation extreme of the rim of the mouth;
      a generally vertical fountain feature comprising a plurality of hanging streamers to be arranged underneath the drip manifold;
      the drip manifold being formed with one plurality of apertures for drinking water to drip out, another plurality of apertures for hanging thereunder the generally vertical fountain feature comprising the plurality of hanging streamers, and then one more hole for connection with the water supply conduit;

the air supply conduit passing through the removable lid and being characterized by an external air-communication run outside the core and extending from the air pump as well as over the confining sidewall or sidewalls and onward to the removable lid, as well as an internal air-communication run inside the core and extending from the removable lid to a lower end providing an air-injection site below the water-intake end of the water supply conduit or through the water supply conduit proximate the water-intake end thereof, with the shelf being provided with an aperture or cut or the shelf being formed with a further aperture or further cut that allows the internal air-communication run to pass therethrough;

whereby the upright elongated tube generally below the lower chosen elevation serves as a reservoir for a week or more supply of drinking water for a plurality of lizards, and a small stream of air supplied by the air pump lifts drinking water from the reservoir, up the water supply conduit by plug or slug flow and into the drip manifold to fall between the upper and lower chosen elevation, and then fall on down past the shelf and back into the reservoir;

whereby the preferred rate of flow of drinking water into the manifold is a trickle or a dribble, where drinking water streams down vertical fountain feature in ever-changing lateral meanders, and finally drips off tip ends of the simulated leafed vegetation in drops; thereby giving lizards a draw to explore the vertical fountain feature, and to be able to look at and take water off a vertical surface in a comfortable posture; and thus whereby the air-pump powered recirculating drinking-water delivery system for one to a plurality of pet, collectible or zoological-specimen lizards confined inside the pen, cage, terrarium or other like confined holding area provides lizard drinking-water service for the confined holding area without otherwise limiting by design the confined holding area to be otherwise as whole a desert climate.

Sixteen. Given the pen, cage, terrarium or other like confined holding area for one to a plurality of pet, collectible or zoological-specimen lizards and an electric-powered air-pump powered recirculating drinking-water delivery system therefor according to Fifteen above, further comprising:

an air-regulating valve disposed in the external air-communication run of the air supply conduit outside of the confined holding for adjustably regulating the flow of air through the air supply conduit (and not flow of water nor the flow of two-phase fluid flow);

whereby the air flow to the water supply conduit can be adjusted by a caretaker without opening the confined holding and hence the water supply to the drip manifold can be regulated such that the discharges out of the plurality of drip outlets is a trickle or dribble; and whereby the electric-powered air pump is disposed outside the confined holding area all for the elimination:
heat production inside either the confined holding area or upright elongated tube;
noise production inside either the confined holding area or upright elongated tube; and/or
vibration production inside either the confined holding area or upright elongated tube.

Seventeen. Given the pen, cage, terrarium or other like confined holding area for one to a plurality of pet, collectible or zoological-specimen lizards and an electric-powered air-pump powered recirculating drinking-water delivery system therefor according to Fifteen above, wherein:

the drip manifold is suspended from the removable lid,
the vertical fountain feature is hung from the drip manifold,
the water supply conduit is connected at the top thereof to the drip manifold, and
the air supply conduit being connected to the removable lid relative to the ending of the external air-communication run and beginning of the internal air-communication run, which is also associated with the air-injection site below the water-intake end of the water supply conduit or is connected through the water supply conduit proximate the water-intake end thereof:
all such that the removable lid, the drip manifold, the vertical fountain feature, the water supply conduit and the internal air-communication run lift up and out as a unit away from the upright elongated tube by a caretaker in performance of periodic maintenance, cleaning and/or other attention to the air-pump powered recirculating drinking-water delivery system;
whereby the recirculating drinking-water delivery device can be lifted out of the confined holding area as a unit by the caretaker and thereafter the removable lid, the drip manifold, the vertical fountain feature, the water supply conduit and the internal air-communication run can be lifted up and out of upright elongated tube by the caretaker as a distinct other unit.

Eighteen. Given the pen, cage, terrarium or other like confined holding area for one to a plurality of pet, collectible or zoological-specimen lizards and an electric-powered air-pump powered recirculating drinking-water delivery system therefor according to Seventeen above, wherein:

the shelf is provided with a distributed plurality of drain holes sized and proportioned for the caretaker reach through the window/mouth and use fingers or other pry to lift the shelf along with the removal of the removable lid, the drip manifold, the vertical fountain feature, the water supply conduit and the internal air-communication run being lifted up and out as a unit;

whereby the shelf may be fixed with any of or unfixed with all the removable lid, the drip manifold, the vertical fountain feature, the water supply conduit and the internal air-communication run but still needs to clear out with the removal of the removable lid, the drip manifold, the vertical fountain feature, the water supply conduit and the internal air-communication run being lifted up and out as a unit, particularly for the water supply conduit and the internal air-communication run.

Nineteen. Given the pen, cage, terrarium or other like confined holding area for one to a plurality of pet, collectible or zoological-specimen lizards and an electric-powered air-pump powered recirculating drinking-water delivery system therefor according to Eighteen above, further comprising:

a pair of filter elements carried by the shelf, one being characterized by ammonia reducing water treatment filter properties, the other being characterized by being black carbon-based, wherein of the pair one is the upper of the pair and defines a floor level for lizards that stretch through or enter the mouth in whole or in part to drink water off the generally vertical fountain feature;

floating plastic bio-balls, or sinking porous ceramic tubes, or both provided in the reservoir below the shelf whereby providing the service of ammonia and/or nitrite reducing work.

Twenty. Given the pen, cage, terrarium or other like confined holding area for one to a plurality of pet, collectible or zoological-specimen lizards and an electric-powered air-pump powered recirculating drinking-water delivery system therefor according to Nineteen above, wherein:

the core of the upright elongated tube between the lid and the shelf or floor forms a grotto-like retreat whereby providing a daytime retreat for nocturnal lizards.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
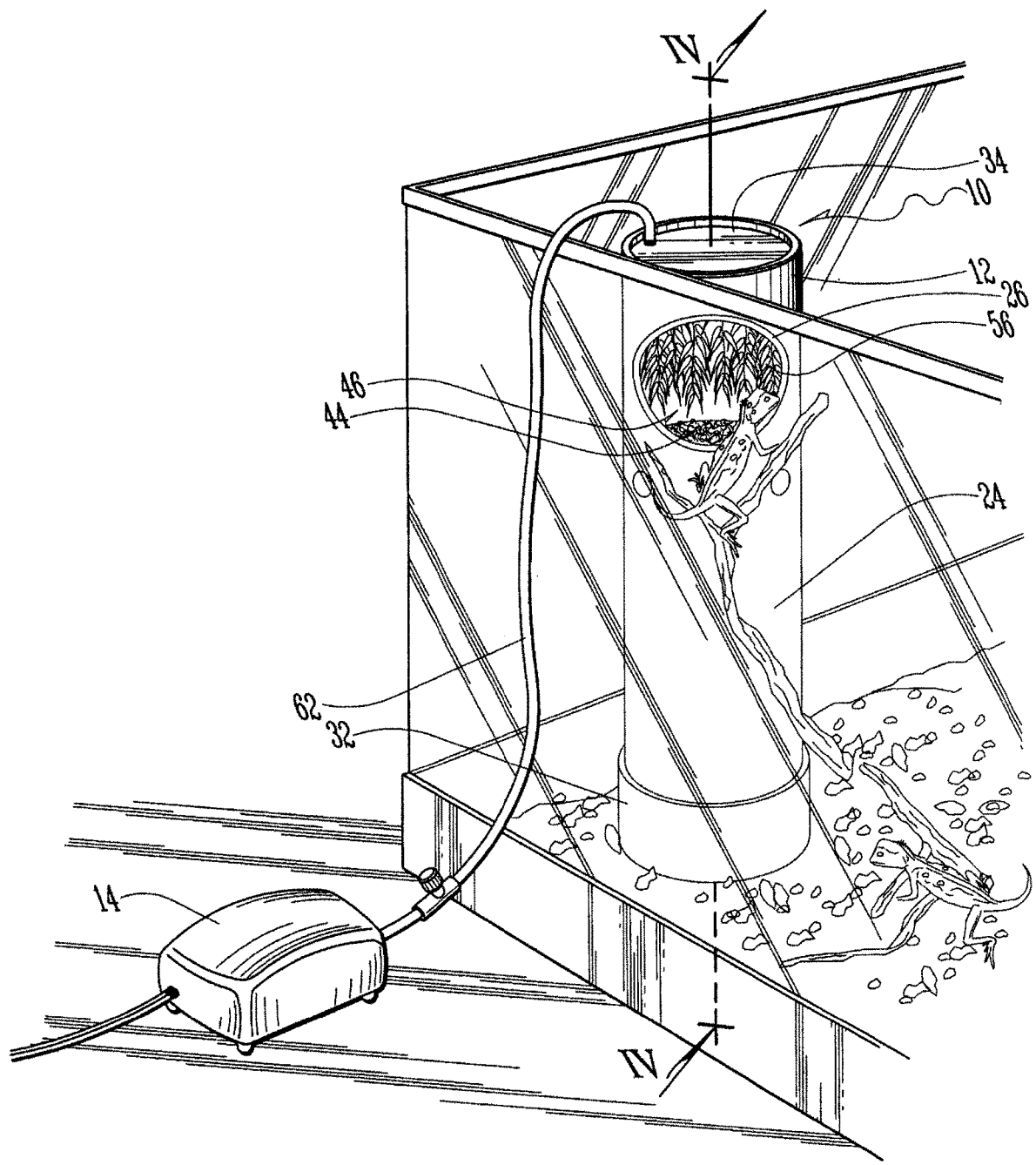
FIG. 1 is a perspective view of an animal watering system in accordance with the invention servicing a terrarium with pet lizards for example and without limitation.
Figure 2:
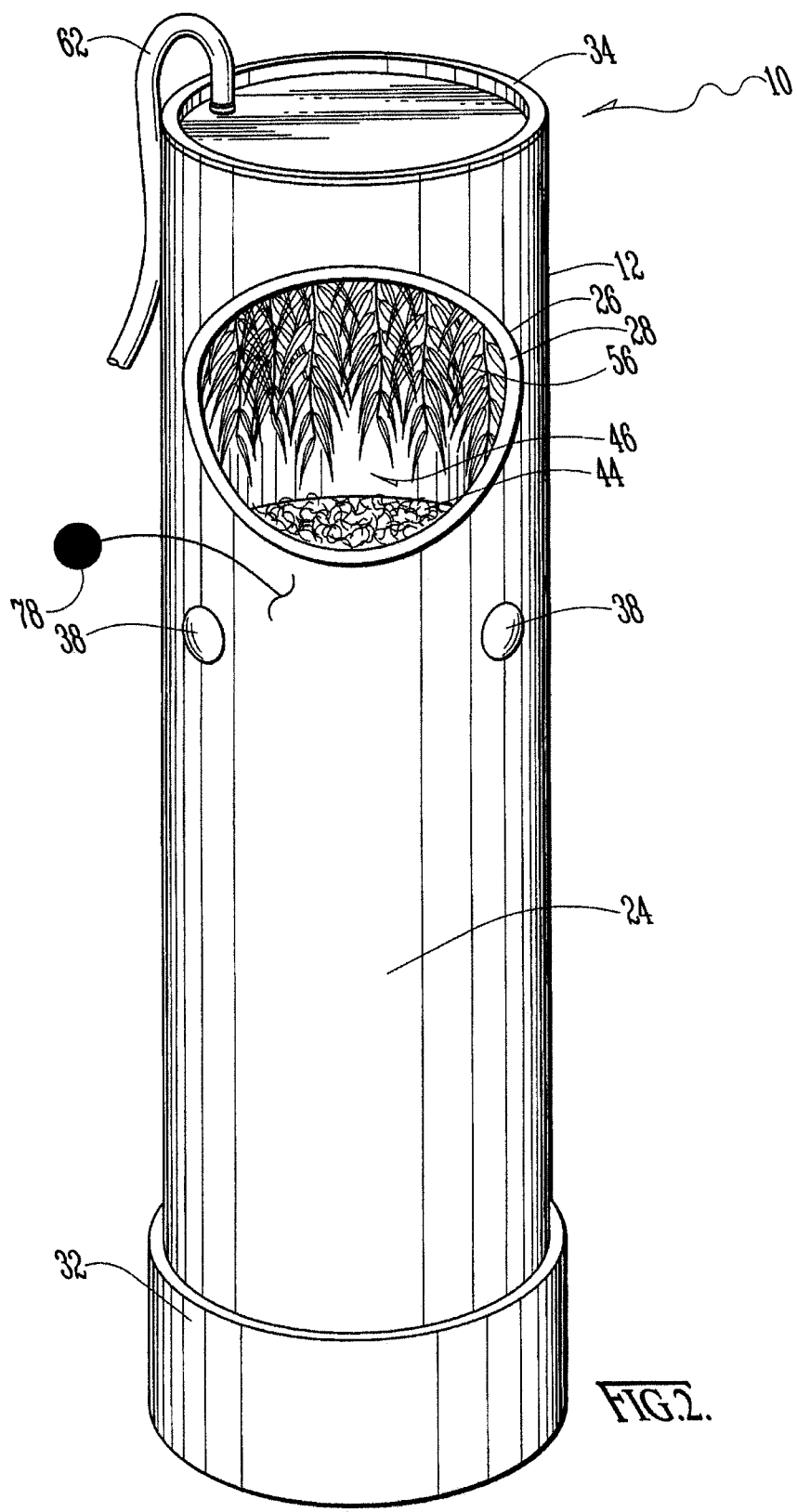
FIG. 2 is an enlarged-scale perspective view of the reservoir in isolation.
Figure 3:
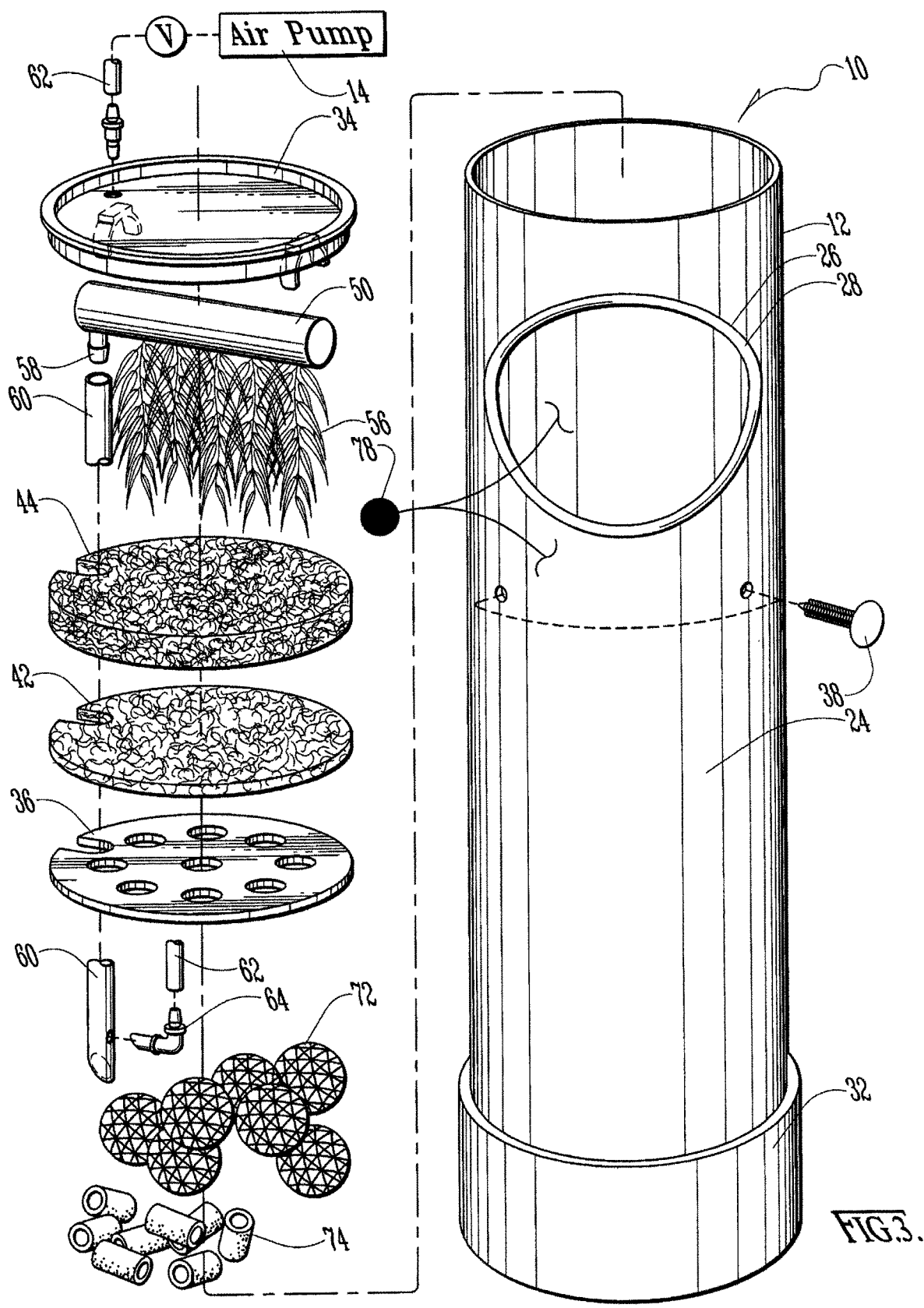
FIG. 3 is an exploded perspective view thereof.
Figure 4:
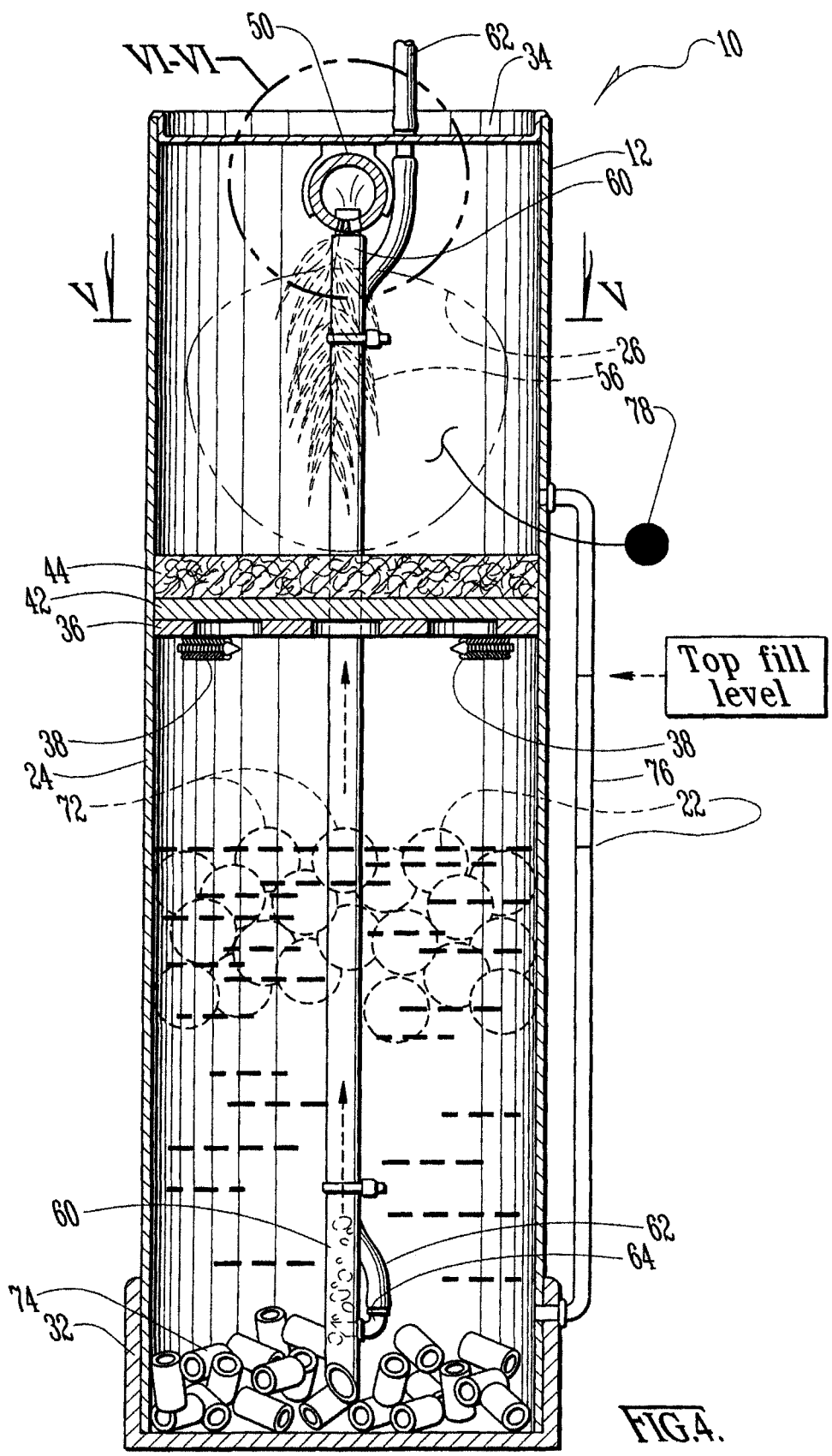
FIG. 4 is a sectional view taken along line IV-IV in FIG. 1.
Figure 5:
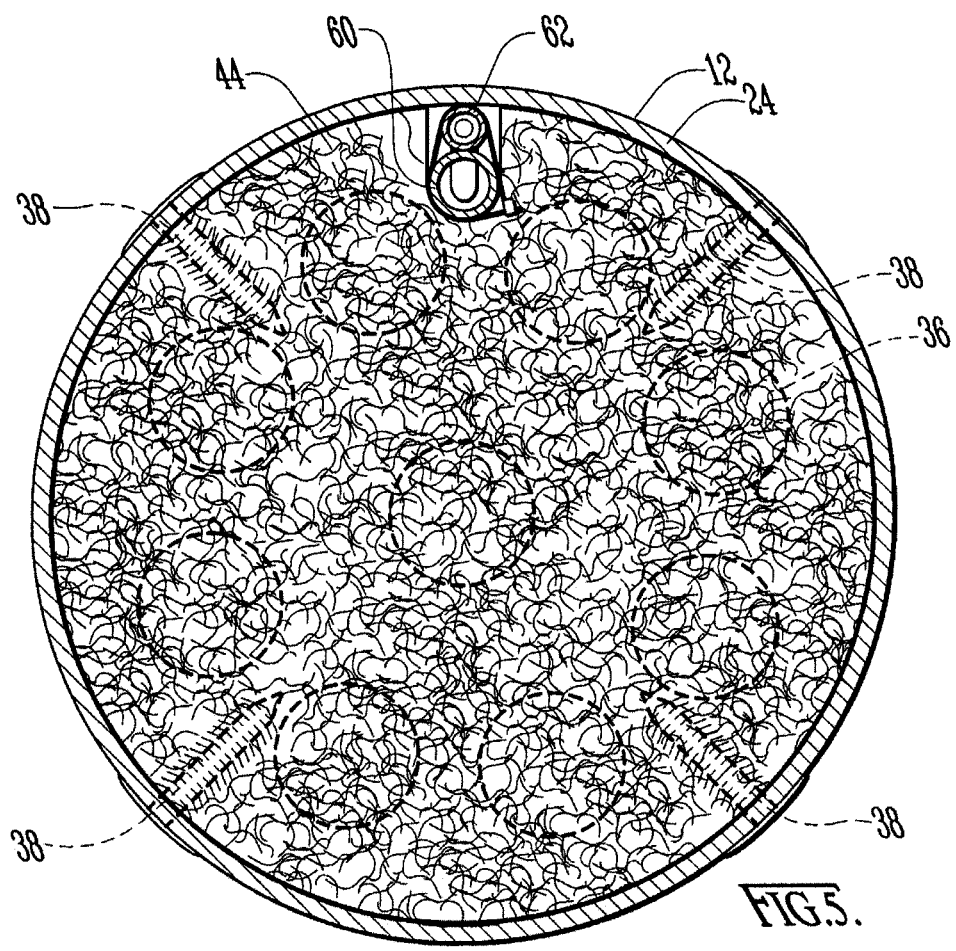
FIG. 5 is a sectional view taken along line V-V in FIG. 4.
Figure 6:
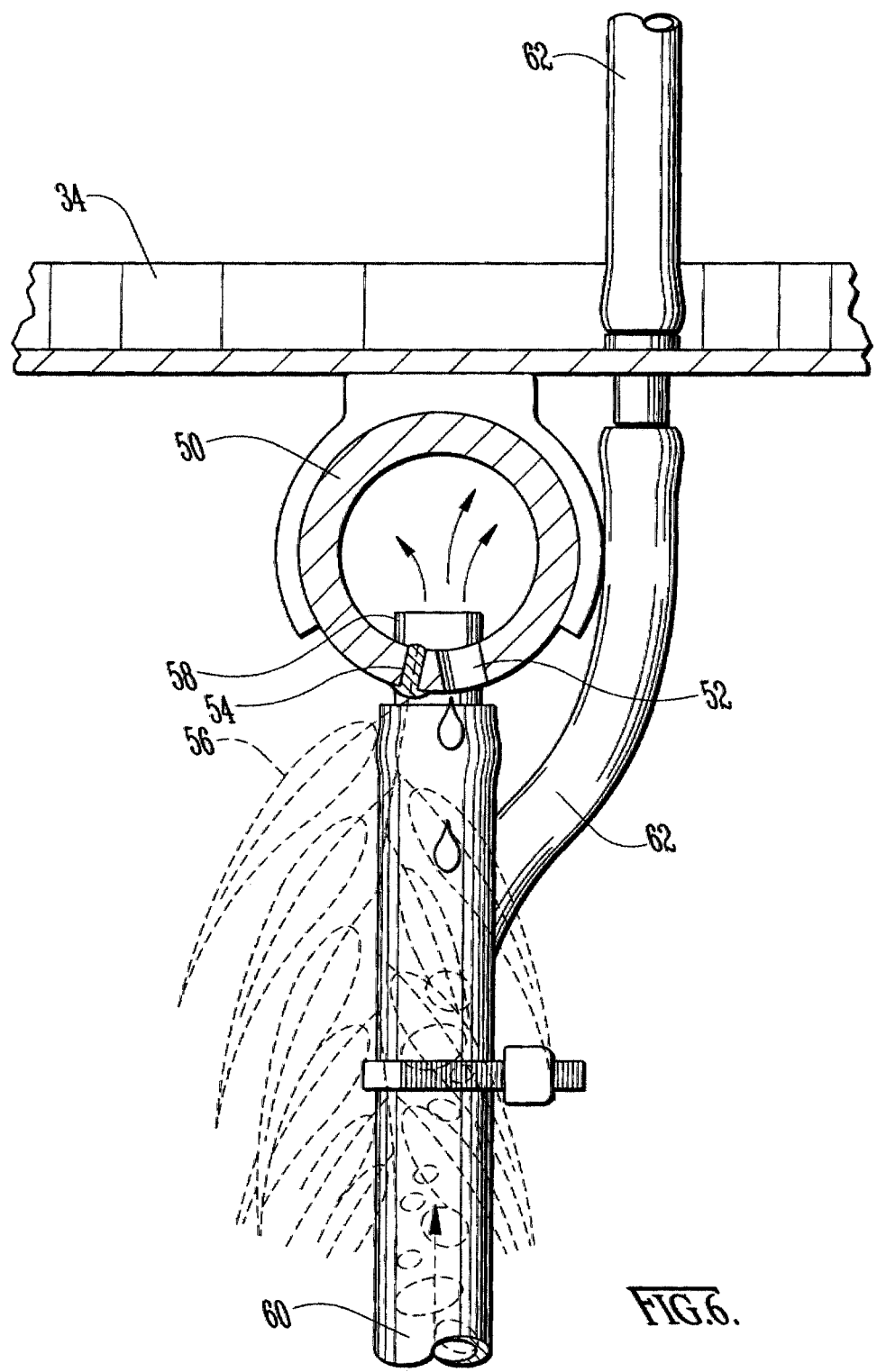
FIG. 6 is an enlarged scale elevational view, partly in section of detail VI-VI in FIG. 4.
Figure 7:
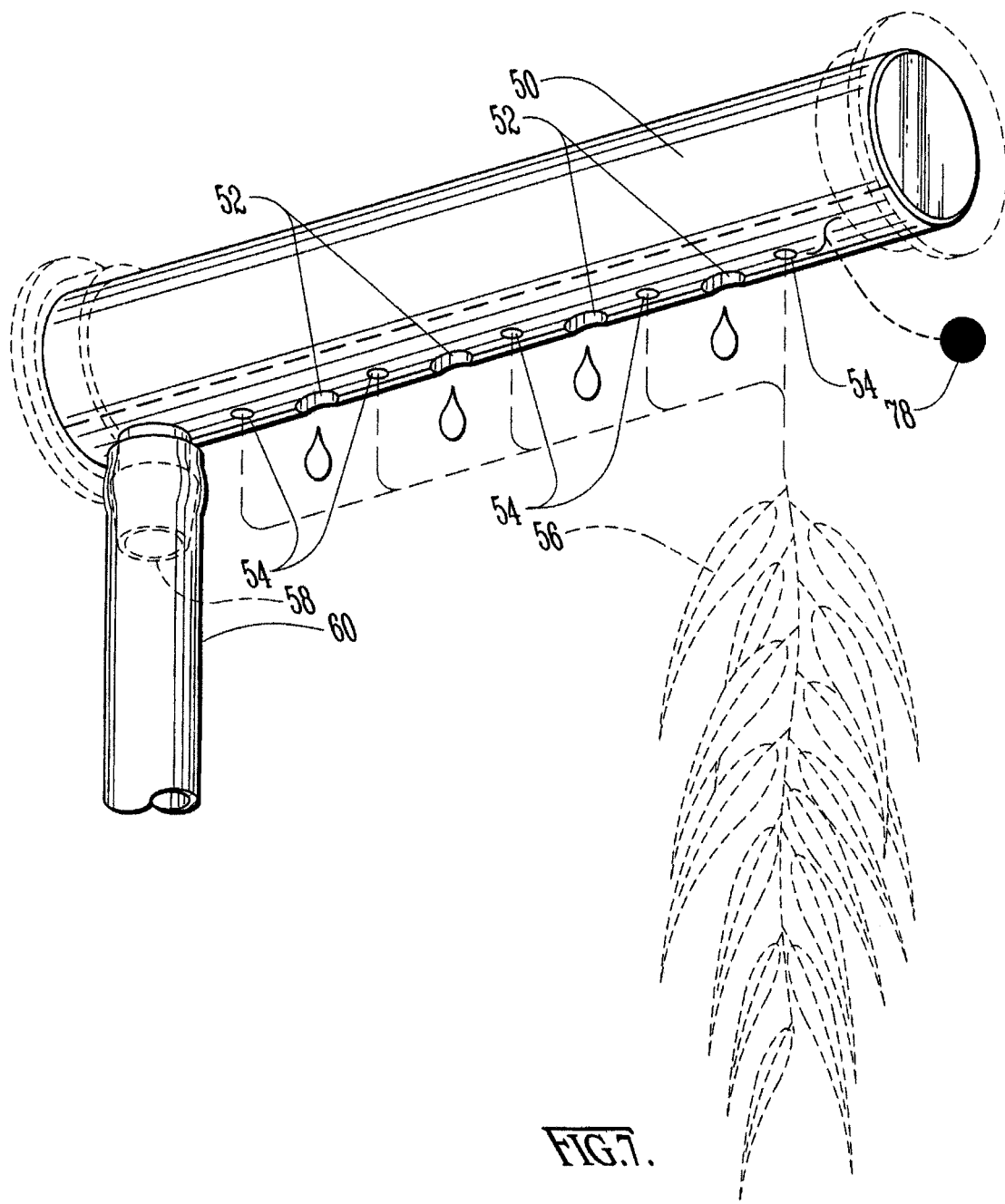
FIG. 7 is a perspective view of FIG. 6.

An animal watering system 10 in accordance with the invention comprises a reservoir 12 and an electric-powered air pump 14.

The reservoir 12 holds a pool 22 of water but it is not intended that the animals drink directly out of the pool 22. Instead, it is preferred if the animal watering system 10 includes a recirculation system wherein the animals have access to water somewhere along the recirculation loop (eg., underneath drip apertures 52).

It is an aspect of the invention that at least the portion of the recirculation system where the animals have access to water (eg., underneath drip apertures 52) is intended to be placed within a pen, a cage, a terrarium or some other like confined holding area.

It is another aspect of the invention to scale the reservoir 12 so that it may be filled to a level 22 that represents as much as a week or several weeks (eg., five weeks) supply of water for the animals within the pen, the cage, the terrarium or the other like confined holding area. This does not actually require a very large reservoir 12 for animals which consume water at a low rate, like lizards for example. In fact, a reservoir 12 that holds a quart (~2 liters) could supply a terrarium with a couple or several lizards could last about five weeks or more.

It is another aspect of the invention to include various decontamination and/or anti-fouling measures. These are provided for keeping the water safely drinkable if the pool 22 is capable of being filled to a level where it may hold a several weeks supply for the animals. For example, a pool of only a quart in volume would likely be able to be a supply for low consumption rate animals like lizards for more than a month.

In one respect, this is ideal because a caretaker might just attend to the chore of servicing the animal watering system 10 to a once a month task, on the same day each month. That way, the caretaker can be fairly assured that the reservoir never runs empty.

It is a further aspect of the invention to do away with submersible pumps. If the water pool level 22 in the reservoir 12 goes dry, a submersible pump will burn out. The air pump 14 will run unaffected by the water level, regardless if the reservoir 12 is dry or not. But the intention to is keep at least a minimal water level in the reservoir 12 at all times. The water pool 22 is cultured with bacteria or microorganisms and the like for digesting or decomposing ammonia and nitrites. So if the water runs dry, it will kill the organisms. While that is certainly unwanted, it is less costly and less of a loss than a burned out submersible pump.

As mentioned above, it is an aspect of the invention to give the animals access to water somewhere along a recirculation loop which draws water out of the pool 22 in the reservoir 12 and then returns what isn't consumed or evaporated back to the pool 22 in the reservoir 12. To add to that aspect of the invention, it is an additional aspect to stream a flow of water down a vertical fountain feature (eg., a depending curtain of simulated bamboo leaves 56). This vertical fountain feature 56 is included for at least two reasons. First, the vertical fountain feature 56 creates a display of water in motion. Second, the vertical fountain feature 56 provides the animals access to the water where animals can take water off the vertical fountain feature 56.

To return to the first reason, the inventor has noticed that his animals are attracted to anything that moves that isn't big enough to eat them. Hence, it is the inventor's belief that the stream of water down the vertical fountain feature 56 draws his animals to explore the vertical fountain feature 56 in part because of the motion. In other words, the water is not served as a static pool (as in a dish, not shown). Instead, the water is served as a dynamic flow down the vertical fountain feature 56. A valve V which provides adjustability over the water flow as will be more particularly described below. The preferred rate of flow is something like a trickle, or a dribble, where water streams down vertical fountain feature 56 in ever-changing lateral meanders, and finally drips off the tip ends of the simulated bamboo leaves (eg., 56) in drops. It is even further preferred that water is delivered to the vertical fountain feature 56 by a drip manifold 50 formed with a plurality of drip apertures 52. Whereby the drip manifold 50 serves a plurality of drip sources (eg., apertures 52) to the vertical fountain feature 56 such that there are a plurality of ever-changing meanders at once streaming down the vertical fountain feature 56.

To return to the second reason, the inventor believes that his various animals actually prefer to take their water off a vertical surface than a horizontal one. As mentioned above, the inventor's various animals include without limitation lizards, amphibians and crickets. Excluding lizards with adaptations like the thorny devil above, a lot of other lizards appear to want to look at water that they drink. Hence water rivulets and drops streaming down a vertical fountain feature 56 provides just the mechanism to allow lizards to drink in a comfortable posture.

There is also a sound component to the water recirculation system. The electric-powered air pump 14 is preferably very quiet. The electric-powered air pump 14 is typical of the kind available for aquariums for home aquarium hobbyists (eg., anywhere from 10 to 20 gallon aquariums being widely popular). These kinds of pumps in fact are typically marketed by just how quiet they are. In fact, the term "quiet" is commonly incorporated in slogans on packaging or the pumps themselves. So the sound component is product of water moving along the recirculation loop. There are both low-volume gurgling noises and low-volume dripping noises. The intensity can be moderately raised or diminished by the valve V, but only moderately so. There is no way to tell if the animals find the noises to be soothing or not. But it is certain that, neither are they scared away by the sounds.

The reservoir 12 comprises a rigid tubular sidewall 24. The reservoir 12 can be scaled to any size but one example for the sake of example is about fifteen inches (~38 cm) high and four and one-half inches (~11 cm) or so in diameter. High up on the sidewall 24 of the tubular reservoir 12 there is a circular mouth 26 also about four and one-half inches (~11 cm) in diameter. The rim of the circular mouth 26 is lined with wire loom 28 or the like to cover the sharp edges and give the animals something to grasp or cling to.

The reservoir 12 has a bottom cap 32 serving as a sealed base. That is, the bottom cap 32 is glued or adhered to the open bottom of the tubular sidewall 24 to form a water tight seal. The open top is covered by a removable lid 34 that provides entry into the core of the reservoir 12 for maintenance. Just below the mouth 26 in the sidewall 24, the tubular sidewall 24 of the reservoir 12 carries a cylindrical apertured shelf 36. The shelf 36 is supported by an annular spacing of push-in plastic rivets 38. The shelf 36 carries a pair of disk filter elements 42 and 44. Both might have the texture of SCOTCH-BRITE @ or the like, but one is an ammonia reducing water treatment filter pad 42 and the other one is a black carbon-based filter pad 44. The black carbon-based filter pad 44 is set on top of the ammonia reducing water treatment pad 42. In fact the inside surfaces of the reservoir 12 are painted black, the outside of the surfaces of the reservoir 12 are painted black, the wire loom 28 is black, the bottom cap 32 is painted black, and the lid 34 is black.

Making everything black is done to absorb light and thus combat reflected light. It is believed that this thereby decreases the opportunity for algae to grow inside the reservoir 12. The mouth 26 in the tubular sidewall 24 provides entry to a simulated grotto 46, the floor of which is the black carbon-based filter pad 44.

The reservoir 12 can be filled up to a water level 22 to where the water just about leaks out the mouth 26.

Suspended or hung in the reservoir 12 just below the lid 34 is a drip manifold 50. This is a closed-end plastic pipe with one series of apertures 52 for water to drip out, another series of apertures 54 for hanging simulated vegetation 56, and then one more hole provided with an inlet fitting 58. The animal watering system 10 in accordance with the invention is provided with a vertical water supply tube 60 that extends from a bottom end virtually touching the bottom cap 32 of the reservoir 12 and a top end connected to the drip manifold 50's inlet fitting 58. The bottom end of the water supply tube 60 is cut an angle so as to stand itself off the bottom 32 and otherwise not situated flush on the bottom 32, which would potentially block the uptake of water out of the pool 22 in the reservoir 12. This water supply tube 60 can be a flexible transparent flexible tube as can be obtained from aquarium stores. The air pump 14 is connected by an air supply line 62 that can also be flexible transparent flexible hose as can be obtained from aquarium stores. The hose 62 is much more flexible than tube 60, and in fact can be coiled.

The air supply line 62 has a first run between the air pump 14 and a through-fitting that is affixed to and extends through the lid 34. The valve V is placed in this first run between the air pump 14 and the lid 34. The air supply line has a second run that extends from the opposite end of the through-fitting through the lid 34, and runs past the drip manifold 50 and then runs along side the water supply tube 60 as both traverse through the filter disks 42 and 44 and shelf 36, until the air supply line 62 terminates in a connection with an elbow fitting 64, one limb of which is projected through the sidewall of the water supply tube 60 proximate the bottom end thereof.

A constant supply of air in the air supply line 62 is injected into the water supply tube 60 at the bottom thereof and lifts water up the water supply tube 60 by slug or plug flow. In other words, there is constant upward traveling train of an endless of series of water bubbles spaced by slugs of water. Hence the drip manifold 50 is supplied water, which drips out the drip apertures 52 therefor.

The simulated vegetation 56 is simulated bamboo leaves to keep in character with a theme of a wet, tropical and/or warm environment. The water drivels down in oscillating meanders along the simulated bamboo leaves 56 and actually drips from the very tip ends.

The inventor has a gecko that is fond of retreating into the grotto 46 during the day and hiding behind the curtain of the bamboo leaves 56. So whatever the reaction is to the sounds of the water recirculation system, the gecko for one is not too bothered by it. Chameleons also like to get wet. But they get their fill of water and then clear out.

The water pool 22 in the reservoir 12 is both provided with plastic bio-balls 72 (which float) and porous ceramic tubes 74 (which sink). Both are sites for bacteria to grow and colonize and thus provide double the service of providing ammonia and nitrite reducing work.

It is desirable to re-fill the reservoir 12 to a full level once the water level 22 has drained down to where the bio-balls 72 are resting on the ceramic tubes 74 and starting to come out of the water. But in a terrarium with three or four lizards, the water level 22 representing about a quart can be ignored for up to five weeks or more. The water just keeps recirculating in the reservoir 12 as the lizards and perhaps evaporation slowly deplete the fill level 22 until it next needs to be refilled.

There is the option of a sight glass 76 to help users to determine when it is time to refill again. Another way of 'gauging' where the water level 22 is inside the reservoir is by noticing the decrease in the flow rate through the fountain apertures 52. As the water level 22 drops, the air supply through the air supply line 62 has to either be increased by way of valve V to maintain the same flowrate, or else the flow rate drops. So a decrease in flowrate is a sign that the water level 22 is dropping. A caretaker can get a sense of when the valve is opened up to a certain extent that, the water level 22 is probably pretty low.

So periodically a caretaker should give some attention to the animal watering system in accordance with the invention, and give it some maintenance along with re-filling it. During these periodic times (eg., once a month), about a quarter of the bio-balls 72 might be taken out and washed clean. The ceramic tubes 74 might simply be replaced.

The color black is indicated in some of the figures by a black spot given reference numeral 78. Again, it believed that by making most surfaces black that this helps prevent alga growth.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. An air-pump powered recirculating drinking-water delivery system for one to a plurality of pet, collectible or zoological-specimen lizards confined inside a pen, cage, terrarium or other like confined holding area; said system comprising:
   an air-pump for sitting outside the confined holding area;
   a recirculating drinking-water delivery device for sitting inside the confined holding area; and
   an external flexible air supply hose connected to the air-pump and being sufficiently elongated to extend to provide air supply service to the recirculating drinking-water delivery device inside the confined holding area;
   the recirculating drinking-water delivery device comprising:
      an upright elongated plastic pipe of no less than four inches (4 inches) in diameter, extending between a bottom end closed by a bottom cap affixed in a water-tight seal with the bottom end, and, an open top end capped by a removable lid;
      the upright elongated plastic pipe defining, as between the bottom cap and removable lid, a core;
      wherein the upright elongated plastic pipe has a circular mouth formed therein high above the bottom cap, which is also four or more inches (4 inches) in diameter;
      the circular mouth being characterized by a rim having a low elevation extreme and high elevation extreme;
      a removable generally circular shelf disposed horizontally inside the upright elongated plastic pipe at a lower-chosen elevation above the bottom cap and proximate the low elevation extreme of the circular mouth;
      an annular seat provision or an annularly-distributed plurality of spaced seat provisions affixed inside the pipe to removably support the shelf at the lower-chosen elevation;
      an air-supply through-fitting disposed through the removable lid having an outside fitting end receiving the air supply service of the outside air-pump and having an inside fitting end;
      a drip manifold comprising an elongated tube being closed at both ends, being characterized by a diameter less than the diameter of the upright elongated plastic pipe, and being three inches (3 inches) or more long;
      the drip manifold being affixed to the removable lid such that when the removable lid is in place on the open top end of the upright elongated plastic pipe, the drip manifold is suspended inside the core at a higher chosen elevation which is level with or higher than the high elevation extreme of the rim of the circular mouth;
      the drip manifold being further formed with at least one drip discharge outlet;
      a water supply conduit inside the core and having an elongated generally vertical run extending between a water-intake end proximate the bottom cap an upper water-communication connection with the drip manifold, the shelf being formed with an aperture or cut that allows the water supply conduit to pass therethrough;
      an internal air supply hose inside the core being elongated between an upper end connected to the inside fitting end of the air-supply through-fitting and a lower end providing an air-injection site below the water-intake end of the water supply conduit or through the water supply conduit proximate the water-intake end thereof, with the shelf being provided with an aperture or cut, or, a further aperture or further cut, that allows the internal air supply hose to pass therethrough;
   whereby the upright elongated plastic pipe generally below the lower chosen elevation serves as a reservoir for a week or more supply of drinking water for a plurality of lizards, and a small stream of air supplied by the air pump lifts drinking water from the reservoir, up the water supply conduit by plug or slug flow and out through the at least one drip discharge outlet to fall between the upper and lower chosen elevation, and then fall on down past the shelf and back into the reservoir; and
   thus whereby the air-pump powered recirculating drinking-water delivery system for one to a plurality of pet, collectible or zoological-specimen lizards confined inside a pen, cage, terrarium or other like confined holding area provides lizard drinking-water service for the confined holding area.

2. The air-pump powered recirculating drinking-water delivery system for one to a plurality of pet, collectible or zoological-specimen lizards confined inside a pen, cage, terrarium or other like confined holding area according to claim 1, wherein:
   the drip manifold comprises an elongated closed-ended plastic pipe characterized by a diameter of generally one-half inch (½ inch).

3. The air-pump powered recirculating drinking-water delivery system for one to a plurality of pet, collectible or zoological-specimen lizards confined inside a pen, cage, terrarium or other like confined holding area according to claim 2, further comprising:
   a generally vertical fountain feature comprising a generally planar curtain arranged as a plurality of hanging synthetic simulative leafed vegetation underneath the elongated tubular drip manifold;
   the elongated tubular drip manifold being formed with one plurality of apertures for drinking water to drip out, another plurality of apertures for hanging thereunder the generally vertical fountain feature comprising the generally planar curtain arranged as a plurality of hanging synthetic simulative leafed vegetation, and then one more hole for connection with the water supply conduit;
   whereby the preferred rate of flow of drinking water into the manifold is a trickle, where drinking water streams down vertical fountain feature in ever-changing lateral meanders, and finally drips off tip ends of the simulated leafed vegetation in drops; thereby giving lizards a draw to explore the vertical fountain feature, and to be able to look at and take water off a vertical surface in a comfortable posture.

4. The air-pump powered recirculating drinking-water delivery system for one to a plurality of pet, collectible or zoological-specimen lizards confined inside a pen, cage, terrarium or other like confined holding area according to claim 2, wherein:
   the drip manifold is suspended from the removable lid,
   the vertical fountain feature is hung from the drip manifold,
   the water supply conduit is connected at the top thereof to the drip manifold, and the internal air supply hose is connected at the upper end thereof being connected to the inside fitting end of the air-supply through-fitting through the removable lid as well as is associated with the air-injection site below the water-intake end of the water supply conduit or is connected through the water supply conduit proximate the water-intake end thereof;

all such that the removable lid, the drip manifold, the vertical fountain feature, the water supply conduit and the internal air supply hose lift up and out as a unit away from the upright elongated plastic pipe by a caretaker in performance of periodic maintenance, cleaning and/or other attention to the air-pump powered recirculating drinking-water delivery system.

5. The air-pump powered recirculating drinking-water delivery system for one to a plurality of pet, collectible or zoological-specimen lizards confined inside a pen, cage, terrarium or other like confined holding area according to claim 4, wherein:

the shelf comprises a cylindrical apertured shelf provided with distributed plurality of drain holes sized and proportioned for the caretaker reach through the mouth and use fingers or other pry to lift the shelf along with the removal of the removable lid, the drip manifold, the vertical fountain feature, the water supply conduit and the internal air supply hose being lifted up and out as a unit;

whereby the shelf may be fixed with any of or unfixed with all the removable lid, the drip manifold, the vertical fountain feature, the water supply conduit and the internal air supply hose but still needs to clear out with the removal of the removable lid, the drip manifold, the vertical fountain feature, the water supply conduit and the internal air supply hose being lifted up and out as a unit, particularly for the water supply conduit and the internal air supply hose.

6. The air-pump powered recirculating drinking-water delivery system for one to a plurality of pet, collectible or zoological-specimen lizards confined inside a pen, cage, terrarium or other like confined holding area according to claim 5, further comprising:

a pair of disk filter elements carried by the shelf, one being characterized by ammonia reducing water treatment filter properties, the other being characterized by being black carbon-based, wherein of the pair one is the upper of the pair and defines a floor level for lizards that stretch through or enter the mouth in whole or in part to drink water off the generally vertical fountain feature;

floating plastic bio-balls, or sinking porous ceramic tubes, or both provided in the reservoir below the shelf whereby providing the service of ammonia and/or nitrite reducing work.

7. The air-pump powered recirculating drinking-water delivery system for one to a plurality of pet, collectible or zoological-specimen lizards confined inside a pen, cage, terrarium or other like confined holding area according to claim 6, wherein:

the core of the upright elongated plastic pipe between the lid and the shelf or floor forms a grotto-like retreat whereby providing a daytime retreat for nocturnal lizards.

8. An air-pump powered recirculating drinking-water delivery system for one to a plurality of pet, collectible or zoological-specimen lizards confined inside a pen, cage, terrarium or other like confined holding area; said system comprising:

an air-pump for sitting outside the confined holding area;
a recirculating drinking-water delivery device for sitting inside the confined holding area; and
an air supply conduit connected to the air-pump and being sufficiently elongated to extend to provide air supply service to the recirculating drinking-water delivery device inside the confined holding area;

the recirculating drinking-water delivery device comprising:

an upright elongated plastic pipe having a core diameter big enough for a caretaker to stick a hand therein and having a height of no less than three times (3×) and no more the six times (6×) the core diameter, the upright elongated plastic pipe extending between a bottom end closed by a bottom cap affixed in a water-tight seal with the bottom end, and, an open top end capped by a removable lid;

the upright elongated plastic pipe defining, as between the bottom cap and removable lid, the core;

wherein the upright elongated plastic pipe has a circular mouth formed therein high above the bottom cap, which has a mouth diameter between ½ to 1 1/2 times the core diameter and big enough for a caretaker to reach therethrough;

the circular mouth being characterized by a rim having a low elevation extreme and high elevation extreme;

a removable generally circular shelf disposed horizontally inside the upright elongated plastic pipe at a lower-chosen elevation above the bottom cap and proximate the low elevation extreme of the circular mouth;

an annular seat provision or an annularly-distributed plurality of spaced seat provisions affixed inside the pipe to removably support the shelf at the lower-chosen elevation;

a drip manifold comprising an elongated tube being closed at both ends, being characterized by a diameter less than the core diameter of the upright elongated plastic pipe, and having a length at least one half (½) the core diameter or longer but abbreviated enough to suspend horizontally inside the core and from the removable lid;

the drip manifold being affixed to the removable lid such that when the removable lid is in place on the open top end of the upright elongated plastic pipe, the drip manifold is suspended inside the core at a higher chosen elevation which is level with or higher than the high elevation extreme of the rim of the circular mouth;

the drip manifold being further formed with at least one drip discharge outlet;

a water supply conduit inside the core and having an elongated generally vertical run extending between a water-intake end proximate the bottom cap an upper water-communication connection with the drip manifold, the shelf being formed with an aperture or cut that allows the water supply conduit to pass therethrough;

the air supply conduit passing through the removable lid and being characterized by an external air-communication run outside the core and extending from the air pump to the removable lid, as well as an internal air-communication run inside the core and extending from the removable lid to a lower end providing an air-injection site below the water-intake end of the water supply conduit or through the water supply conduit proximate the water-intake end thereof, with the shelf being provided with an aperture or cut or the shelf being formed with a further aperture or further cut that allows the internal air-communication run to pass therethrough;

whereby the upright elongated plastic pipe generally below the lower chosen elevation serves as a reservoir for a week or more supply of drinking water for a plurality of lizards, and a small stream of air supplied by the air pump lifts drinking water from the reservoir, up the water supply conduit by plug or slug flow and out through the at least one drip discharge outlet to fall between the upper and lower chosen elevation, and then fall on down past the shelf and back into the reservoir; and thus whereby the air-pump powered recirculating drinking-water delivery system for one to a plurality of pet, collectible or zoological-specimen lizards confined inside a pen, cage, terrarium or other like confined holding area provides lizard drinking-water service for the confined holding area.

9. The air-pump powered recirculating drinking-water delivery system for one to a plurality of pet, collectible or zoological-specimen lizards confined inside a pen, cage, terrarium or other like confined holding area according to claim 8, wherein:

the drip manifold comprises an elongated closed-ended plastic pipe characterized by a diameter between $1/128$ and $1/4$ times the core diameter.

10. The air-pump powered recirculating drinking-water delivery system for one to a plurality of pet, collectible or zoological-specimen lizards confined inside a pen, cage, terrarium or other like confined holding area according to claim 8, further comprising:

a generally vertical fountain feature comprising a generally planar curtain arranged as a plurality of hanging synthetic simulative leafed vegetation underneath the elongated tubular drip manifold;

the elongated tubular drip manifold being formed with one plurality of apertures for drinking water to drip out, another plurality of apertures for hanging thereunder the generally vertical fountain feature comprising the generally planar curtain arranged as a plurality of hanging synthetic simulative leafed vegetation, and then one more hole for connection with the water supply conduit;

whereby the preferred rate of flow of drinking water into the manifold is a trickle, where drinking water streams down vertical fountain feature in ever-changing lateral meanders, and finally drips off tip ends of the simulated leafed vegetation in drops; thereby giving lizards a draw to explore the vertical fountain feature, and to be able to look at and take water off a vertical surface in a comfortable posture.

11. The air-pump powered recirculating drinking-water delivery system for one to a plurality of pet, collectible or zoological-specimen lizards confined inside a pen, cage, terrarium or other like confined holding area according to claim 8, wherein:

the drip manifold is suspended from the removable lid, the vertical fountain feature is hung from the drip manifold, the water supply conduit is connected at the top thereof to the drip manifold, and the air supply conduit being connected to the removable lid relative to the ending of the external air-communication run and beginning of the internal air-communication run, which is also associated with the air-injection site below the water-intake end of the water supply conduit or is connected through the water supply conduit proximate the water-intake end thereof:

all such that the removable lid, the drip manifold, the vertical fountain feature, the water supply conduit and the internal air-communication run lift up and out as a unit away from the upright elongated plastic pipe by a caretaker in performance of periodic maintenance, cleaning and/or other attention to the air-pump powered recirculating drinking-water delivery system.

12. The air-pump powered recirculating drinking-water delivery system for one to a plurality of pet, collectible or zoological-specimen lizards confined inside a pen, cage, terrarium or other like confined holding area according to claim 11, wherein:

the shelf comprises a cylindrical apertured shelf provided with distributed plurality of drain holes sized and proportioned for the caretaker reach through the mouth and use fingers or other pry to lift the shelf along with the removal of the removable lid, the drip manifold, the vertical fountain feature, the water supply conduit and the internal air-communication run being lifted up and out as a unit;

whereby the shelf may be fixed with any of or unfixed with all the removable lid, the drip manifold, the vertical fountain feature, the water supply conduit and the internal air-communication run but still needs to clear out with the removal of the removable lid, the drip manifold, the vertical fountain feature, the water supply conduit and the internal air-communication run being lifted up and out as a unit, particularly for the water supply conduit and the internal air-communication run.

13. The air-pump powered recirculating drinking-water delivery system for one to a plurality of pet, collectible or zoological-specimen lizards confined inside a pen, cage, terrarium or other like confined holding area according to claim 12, further comprising:

a pair of disk filter elements carried by the shelf, one being characterized by ammonia reducing water treatment filter properties, the other being characterized by being black carbon-based, wherein of the pair one is the upper of the pair and defines a floor level for lizards that stretch through or enter the mouth in whole or in part to drink water off the generally vertical fountain feature;

floating plastic bio-balls, or sinking porous ceramic tubes, or both provided in the reservoir below the shelf whereby providing the service of ammonia and/or nitrite reducing work.

14. The air-pump powered recirculating drinking-water delivery system for one to a plurality of pet, collectible or zoological-specimen lizards confined inside a pen, cage, terrarium or other like confined holding area according to claim 13, wherein:

the core of the upright elongated plastic pipe between the lid and the shelf or floor forms a grotto-like retreat whereby providing a daytime retreat for nocturnal lizards.

15. A pen, cage, terrarium or other like confined holding area for one to a plurality of pet, collectible or zoological-specimen lizards and an electric-powered air-pump powered recirculating drinking-water delivery system therefor; comprising:

a pen, cage, terrarium or other like confined holding area for one to a plurality of pet, collectible or zoological-specimen lizards;

the confined holding area being characterized by a confining sidewall or sidewalls, and, the confining sidewall or sidewalls by a confining height;

an electric-powered air-pump sitting outside the confined holding area;

a recirculating drinking-water delivery device sitting inside the confined holding area;

a flexible air supply conduit connected to the air-pump and being sufficiently elongated to extend over the confining sidewall or sidewalls, and further extend inside the confined holding area to provide air supply service to the recirculating drinking-water delivery device therein;

the recirculating drinking-water delivery device comprising:

an upright elongated tube defining an upright elongated core having a core diameter big enough for a caretaker to stick a hand therein;

the upright elongated tube extending between a bottom end closed by a bottom cap affixed in a water-tight seal with the bottom end, and, an open top end capped by a removable lid;

the upright elongated tube and removable lid having a combined height less than the confining height of the confining sidewall or sidewalls of the confined holding area;

the upright elongated tube further being formed with a mouth above the bottom cap, which mouth is sized to allow a pet, collectible or zoological-specimen lizard to pass therethrough;

the mouth being characterized by a rim having one portion forming a low elevation extreme and another portion forming a high elevation extreme;

a removable shelf disposed horizontally inside the upright elongated tube at a lower-chosen elevation high above the bottom cap and proximate the low elevation extreme of the mouth;

a drip manifold affixed to the removable lid such that when the removable lid is in place on the open top end of the upright elongated tube, the drip manifold is suspended inside core at a higher chosen elevation which is level with or higher than the high elevation extreme of the rim of the mouth;

a generally vertical fountain feature comprising a plurality of hanging streamers to be arranged underneath the drip manifold;

the drip manifold being formed with one plurality of apertures for drinking water to drip out, another plurality of apertures for hanging thereunder the generally vertical fountain feature comprising the plurality of hanging streamers, and then one more hole for connection with the water supply conduit;

the air supply conduit passing through the removable lid and being characterized by an external air-communication run outside the core and extending from the air pump as well as over the confining sidewall or sidewalls and onward to the removable lid, as well as an internal air-communication run inside the core and extending from the removable lid to a lower end providing an air-injection site below the water-intake end of the water supply conduit or through the water supply conduit proximate the water-intake end thereof, with the shelf being provided with an aperture or cut or the shelf being formed with a further aperture or further cut that allows the internal air-communication run to pass therethrough;

whereby the upright elongated tube generally below the lower chosen elevation serves as a reservoir for a week or more supply of drinking water for a plurality of lizards, and a small stream of air supplied by the air pump lifts drinking water from the reservoir, up the water supply conduit by plug or slug flow and into the drip manifold to fall between the upper and lower chosen elevation, and then fall on down past the shelf and back into the reservoir;

whereby the preferred rate of flow of drinking water into the manifold is a trickle, where drinking water streams down vertical fountain feature in ever-changing lateral meanders, and finally drips off tip ends of the simulated leafed vegetation in drops; thereby giving lizards a draw to explore the vertical fountain feature, and to be able to look at and take water off a vertical surface in a comfortable posture; and thus whereby the air-pump powered recirculating drinking-water delivery system for one to a plurality of pet, collectible or zoological-specimen lizards confined inside the pen, cage, terrarium or other like confined holding area provides lizard drinking-water service for the confined holding area.

16. The pen, cage, terrarium or other like confined holding area for one to a plurality of pet, collectible or zoological-specimen lizards and an electric-powered air-pump powered recirculating drinking-water delivery system therefor according to claim 15, further comprising:

an air-regulating valve disposed in the external air-communication run of the air supply conduit outside of the confined holding for adjustably regulating the flow of air through the air supply conduit (and not flow of water nor the flow of two-phase fluid flow);

whereby the air flow to the water supply conduit can be adjusted by a caretaker without opening the confined holding and hence the water supply to the drip manifold can be regulated such that the discharges out of the plurality of drip outlets is a trickle or dribble; and whereby the electric-powered air pump is disposed outside the confined holding area all for the elimination:

heat production inside either the confined holding area or upright elongated tube;

noise production inside either the confined holding area or upright elongated tube; and/or vibration production inside either the confined holding area or upright elongated tube.

17. The pen, cage, terrarium or other like confined holding area for one to a plurality of pet, collectible or zoological-specimen lizards and an electric-powered air-pump powered recirculating drinking-water delivery system therefor according to claim 15, wherein:

the drip manifold is suspended from the removable lid, the vertical fountain feature is hung from the drip manifold, the water supply conduit is connected at the top thereof to the drip manifold, and the air supply conduit being connected to the removable lid relative to the ending of the external air-communication run and beginning of the internal air-communication run, which is also associated with the air-injection site below the water-intake end of the water supply conduit or is connected through the water supply conduit proximate the water-intake end thereof:

all such that the removable lid, the drip manifold, the vertical fountain feature, the water supply conduit and the internal air-communication run lift up and out as a unit away from the upright elongated tube by a caretaker in performance of periodic maintenance, cleaning and/or other attention to the air-pump powered recirculating drinking-water delivery system;

whereby the recirculating drinking-water delivery device can be lifted out of the confined holding area as a unit by the caretaker and thereafter the removable lid, the drip manifold, the vertical fountain feature, the water supply conduit and the internal air-communication run can be lifted up and out of upright elongated tube by the caretaker as a distinct other unit.

18. The pen, cage, terrarium or other like confined holding area for one to a plurality of pet, collectible or zoological-specimen lizards and an electric-powered air-pump powered recirculating drinking-water delivery system therefor according to claim 17, wherein:

the shelf is provided with a distributed plurality of drain holes sized and proportioned for the caretaker reach through the mouth and use fingers or other pry to lift the shelf along with the removal of the removable lid, the drip manifold, the vertical fountain feature, the water supply conduit and the internal air-communication run being lifted up and out as a unit;

whereby the shelf may be fixed with any of or unfixed with all the removable lid, the drip manifold, the vertical fountain feature, the water supply conduit and the internal air-communication run but still needs to clear out with the removal of the removable lid, the drip manifold, the vertical fountain feature, the water supply conduit and the internal air-communication run being lifted up and out as a unit, particularly for the water supply conduit and the internal air-communication run.

19. The pen, cage, terrarium or other like confined holding area for one to a plurality of pet, collectible or zoological-specimen lizards and an electric-powered air-pump powered recirculating drinking-water delivery system therefor according to claim 18, further comprising:

a pair of filter elements carried by the shelf, one being characterized by ammonia reducing water treatment filter properties, the other being characterized by being black carbon-based, wherein of the pair one is the upper of the pair and defines a floor level for lizards that stretch through or enter the mouth in whole or in part to drink water off the generally vertical fountain feature;

floating plastic bio-balls, or sinking porous ceramic tubes, or both provided in the reservoir below the shelf whereby providing the service of ammonia and/or nitrite reducing work.

20. The pen, cage, terrarium or other like confined holding area for one to a plurality of pet, collectible or zoological-specimen lizards and an electric-powered air-pump powered recirculating drinking-water delivery system therefor according to claim 19, wherein:

the core of the upright elongated tube between the lid and the shelf or floor forms a grotto-like retreat whereby providing a daytime retreat for nocturnal lizards.

* * * * *